United States Patent [19]

Barr, Jr. et al.

[11] Patent Number: 4,627,067
[45] Date of Patent: Dec. 2, 1986

[54] MID-INFRARED LASER IN MOLECULAR HYDROGEN

[75] Inventors: Thomas A. Barr, Jr., Huntsville; William E. McCracken, Elkmont; William B. McKnight, Huntsville, all of Ala.

[73] Assignee: The United States of America as represented by the Secretary of the Army, Washington, D.C.

[21] Appl. No.: 446,743

[22] Filed: Dec. 3, 1982

[51] Int. Cl.$^4$ .............................................. H01S 3/097
[52] U.S. Cl. ........................................ 372/81; 372/55
[58] Field of Search ...................... 372/55, 81, 82, 83, 372/90, 57

[56] References Cited

U.S. PATENT DOCUMENTS 3,605,038 9/1971 Byrne et al. ............................ 372/55
3,789,319 1/1974 Rhodes .................................. 372/55
4,144,464 3/1979 Loree et al. ............................ 372/57

OTHER PUBLICATIONS

Dreyfus et al; "Molecular-Hydrogen Laser: 1098-1613 Å"; *Physical Review A;* vol. 9, No. 6; pp. 2635-2648; Jun. 1974.

*Primary Examiner*—William L. Sikes
*Assistant Examiner*—Robert E. Wise
*Attorney, Agent, or Firm*—John C. Garvin, Jr.; Freddie M. Bush; James T. Deaton

[57] ABSTRACT

A new mid-infrared laser in hydrogen which produces an output when excited by a high voltage pulse discharge in a long, low loss cavity to produce laser action in three or more lines as output pulses with lengths varying from less than 1 microsecond to over 6 microseconds with wavelengths in the 3 $\mu$m band including 3.71 $\mu$m, 3.77 $\mu$m, and 3.84 $\mu$m.

4 Claims, 6 Drawing Figures

MID-INFRARED LASER IN MOLECULAR HYDROGEN

The invention described herein may be manufactured, used, and licensed by or for the Government for governmental purposes without the payment to us of any royalties thereon.

BACKGROUND OF THE INVENTION

In the past, various lasers have been provided but have had the limitations of the use of poisonous gases, gases that are expensive, and other various aspects of the lasers that limit their use. Therefore, there is a need for a laser that utilizes an inexpensive and nonpoisonous gas that is plentiful and can be readily provided.

Therefore, it is an object of this invention to provide a mid-infrared laser in hydrogen.

Another object of this invention is to provide a laser gas that can be pumped to provide a multiplicity of laser lines.

Still another object of this invention is to provide a laser that can be used in military rangefinders, jammers, or other pulsed laser applications.

Still another object of this invention is to provide a laser from which output pulses are produced with varying lengths from less than 1 microsecond to over 6 microseconds.

Other objects and advantages of this invention will be obvious to those skilled in this art.

SUMMARY OF THE INVENTION

In accordance with this invention, a mid-infrared laser in hydrogen is provided in which the hydrogen gas is excited by a high voltage pulsed discharge in a long, low loss cavity to cause the hydrogen gas to lase and produce three or more output pulses with lengths varying from less than 1 microsecond to over 6 microseconds at wave lengths in the 3 $\mu$m band including 3.71 $\mu$m, 3.77 $\mu$m, and 3.84 $\mu$m. Other wavelengths should be identifiable given the proper conditions.

DESCRIPTION OF THE PREFERRED EMBODIMENT

Figure 1:
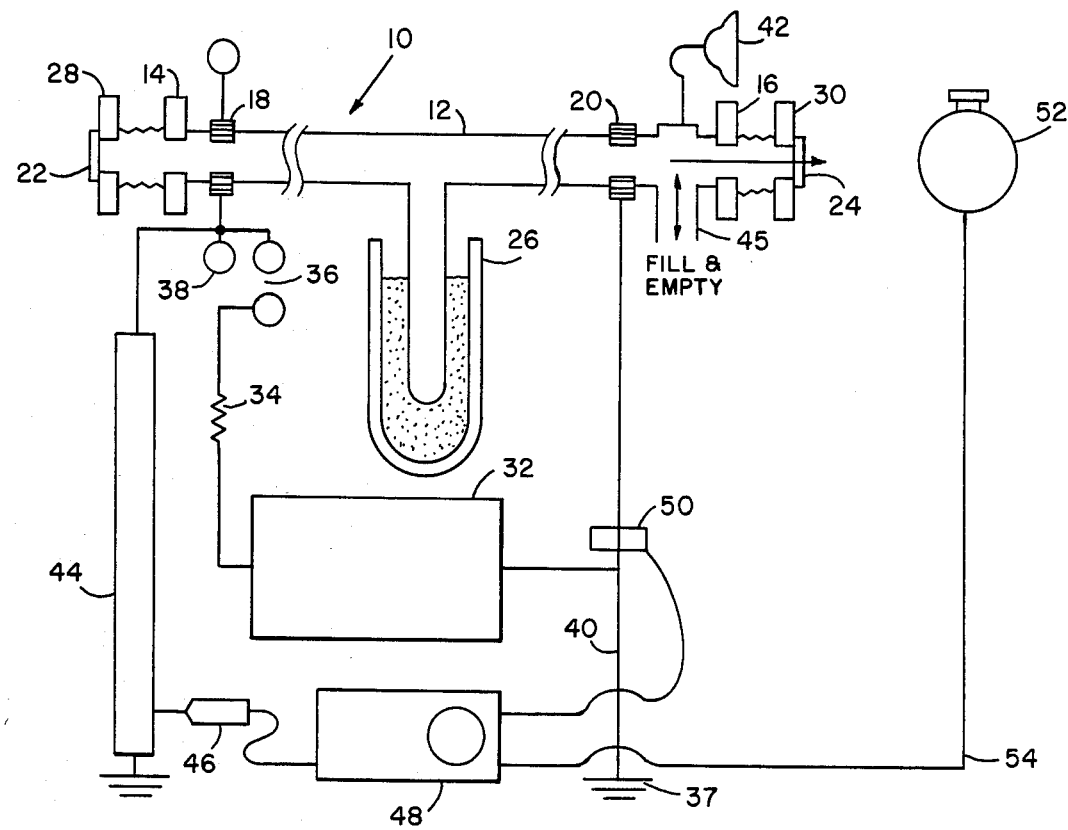
FIG. 1 is a schematic illustration of the system used in producing the laser output from the hydrogen gas.

Referring now to FIG. 1, the system and apparatus 10 for carrying out and producing a mid-infrared laser in hydrogen in accordance with this invention consist of a Pyrex conical glass pipe 12 which is 2.54-cm (1-in) in diameter. Thus tube 12 includes 2, 3.05-m (10-feet) sections plus end Ts 14 and 16, discharge electrodes 18 and 20, mirror assemblies 22 and 24, and a center 5.08 $\times$ 30.48-cm (2$\times$12-in.) cross section with an appended nitrogen cold trap 26. The cavity output end at 24 used a flat sapphire window mirror, dielectric coated to 95% reflectivity at 3.7 $\mu$m. Concave Pyrex mirror 22, 20-m radius of curvature, dielectric coated to 99+%, formed the other end of the cavity. Both mirrors at 22 and 24 were partially transmitting in the visible, and a He-Ne laser was used for alignment of the cavity including mirrors 22 and 24 that are mounted on adjustable seal mounts 28 and 30 for appropriate adjustment of the mirrors. A Marx bank 32 is connected through resistor 34, discharge peaking spark gap 36 and corona ring 38 that is connected to the high voltage end of the circuit through electrical discharge electrode 18. Electrical discharge ring 20 is connected to ground 37 as well as Marx bank 32 through connection 40. Marx bank 32 consisted of four stages, each a 0.032-$\mu$F, 125-kV fast discharge capacitor. Normal charge voltage for the Marx bank was in the range between 60 and 75 kV with corresponding erected voltages of 240–300 kV. Voltage applied to the laser was measured using a 10:1 RC voltage divider 44 that was connected to corona ring 38 and through high voltage probe 46 to a Tektronix 7834 storage oscilloscope 48. Voltage divider 44 can be used with a Tektronix model P6015 probe 46 to provide an overall attenuation of 10000:1. to measure the ground return circuit at 40, a current loop 50 is provided such as a Pearson model 110 current transformer which is connected to oscilloscope 48 for making this measurement. Also, laser tube 12 is provided with a conventional pressure gauge 42 that has a reading of about 0–20 Torr and is connected to the tube in a conventional manner. Also, a filling and emptying passage 45 is provided for placing the hydrogen gas into the laser tube in a conventional manner. The output produced by laser 10 was detected on a gold-doped germanium, liquid nitrogen-cooled detector 52 that has its output connected through lead 54 to oscilloscope 48.

Typical operating conditions for this laser are hydrogen gas pressure, 2–8 Torr; current, 100–1200 A; run voltage (as opposed to initiation voltage) 10–50 kV; discharge duration, 0.5–8 $\mu$sec. Current, run voltage and discharge times were primarily dependent on the discharge series resistors 34, which were wire wound and ceramic coated and ranged in value from 25–1000$\Omega$. Most experiments were done at room temperature; however, some were done with the laser tube in contact with liquid nitrogen bath 26. With the tube in contact with a liquid nitrogen bath, an estimated hydrogen gas temperature of about 100K was obtained, inferred from pressure change in tube 12 during cooling. Some changes in laser action were noted during cold tests; however, these may have been caused by alignment problems and no conclusions were drawn from the experiments. The appended cold trap was also tested and after an hour of trappings at liquid nitrogen temperature no difference in laser performance was noted.

In operation, laser tube 12 is evacuated in a conventional manner and then filled with hydrogen gas to pressures between 1 and 10 Torr (higher pressure may be used for shorter discharge tube or for higher discharge voltage). The preferred pressure is about 4 Torr. Next, laser mirrors 22 and 24 are aligned by any standard method such as by the use of a helium-neon laser (this need not be done each cycle of operation and in fact may be done only rarely, depending on the physical stability of the laser). With the mirrors aligned, the capacitors of Marx bank 32 are charged in parallel and then discharged in series across spark gap 36 and electrodes 18 and 20 through the hydrogen gas in laser tube 12. This electric discharge from electrode 18 to electrode 20 properly excites the hydrogen laser gas to produce laser output through the output in mirror 24 and is detected by detector 52. The output produced by detector 52 is recorded on oscilloscope 48 and also, current loop 50 detects its signal at the output and provides an input to oscilloscope 48 for recording the signal at the output. Also, oscilloscope 48 records the signal from the input to the system through voltage divider 44 and high voltage probe 46.

Figure 2:
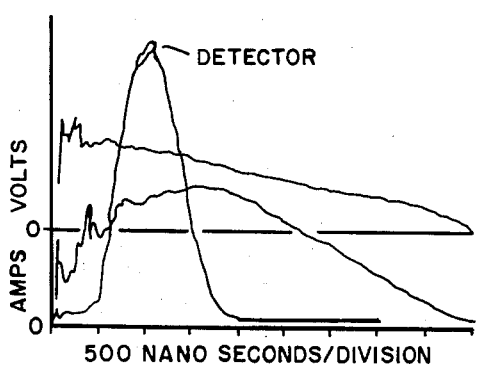
FIG. 2 illustrates a short pulse laser output typical of high current, low series resistance (100-$\Omega$) performance.
Figure 3:
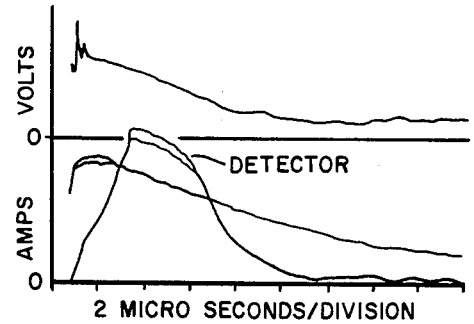
FIG. 3 illustrates a long pulse laser output typical of low current ($\sim$100-A) high series resistance (1000-$\Omega$) performance.

From tests, two distinct laser output patterns were noted. During high current discharge a very short ($\approx 0.5$-$\mu$ sec) relatively high intensity ($\approx 7$-V detector output) pulse close to the leading edge of the current pulse was observed. As the peak current was lowered, i.e., series resistance 34 increased, the pulse occurred later in the current cycle, was lower in peak intensity, and stretched out to several microseconds. Eventually, when 500 and 1000-$\Omega$ resistors were used for resistor 34, and the current was down to 150 A or less, the pulse took on a distinctively different shape. It appeared after the current peak, followed the current shape for 3–4 $\mu$sec and then terminated. FIG. 2 shows oscilloscope traces for a short pulse; FIG. 3 shows similar traces for a long pulse.

Figure 4:
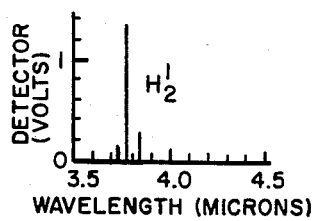
FIG. 4 is a graph illustrating the location and relative intensities of the mid-infrared laser lines in hydrogen.

The hydrogen laser output is in the mid-infrared band and has been identified as being an electronic-vibrational-rotational transition in the triplet series. Spectroscopic notation identifies it as the $a^3\Sigma_g^+ \to c^3\pi_u$ transition. Three laser lines have been identified to date at 3.71 $\mu$m, 3.77 $\mu$m, and 3.84 $\mu$m; others should be possible to find given the proper conditions. These spectra, giving the location and relative intensities of the lines, are shown in FIG. 4.

In assigning these lines to this invention we noted that laser transitions have been seen in the spectrum of hydrogen that are assigned to electronic transitions in the singlet system; consequently, we calculated singlet transitions based on published spectroscopic data, and found that E-B (0-5)P(2) line at 3.70 $\mu$m and K-C (1-6)P(4) line at 3.76 $\mu$m. However, we did not find a kinetically coupled set of singlet transitions for the set of three observed lines.

Figure 5:
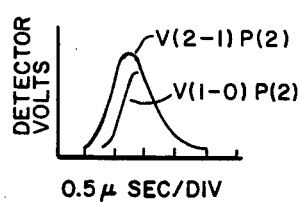
FIG. 5 is a graph illustrating the time delay between a (2-1)P (2) line and the (1-0)P (2) line in hydrogen.
Figure 6:
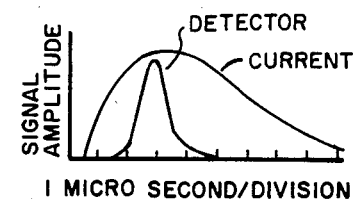
FIG. 6 is a graph illustrating the typical detector and current oscilloscope signals showing termination of laser action prior to current decay.

Using triplet spectroscopic data from the same source, lines in the $a^3\Sigma_g^+ \to c^3\pi_u$ band in this wavelength region were calculated and were found to match the observed set in hydrogen. The calculated lines are shown in Table I below. In this group, the P(2) transistions of the V(1-0), V(2-1), and V(3-2) bands correspond very closely to the three wave-lengths obtained from a pattern which we considered kinetically plausible. It is found experimentally that the strongest transition, the V(2-1) line occurs first and is followed in about 0.2 $\mu$s by the other two lines as shown in FIG. 5. This is not unexpected in cascading lasers, and indicates that the laser action on the main line kinetically produces conditions for the other two lines to appear. A detailed kinetics model would be expected to show this pattern.

TABLE I

| Calculated Wavelengths in the $o^3\Sigma_g^+ \to c^3\pi_u$ Hydrogen Band | | | | | |
|---|---|---|---|---|---|
| Line | $\lambda(\mu m)$ | Line | $\lambda(\mu m)$ | Line | $\lambda(\mu m)$ |
| (1-0)P(1) | 3.76 | (2-1)P(1) | 3.69 | (3-2)P(1) | 3.63 |
| (1-0)P(2) | 3.84* | (2-1)P(2) | 3.77* | (3-2)P(2) | 3.71* |
| (1-0)P(3) | 3.94 | (2-1)P(3) | 3.84 | (3-2)P(3) | 3.78 |

*Assignments for observed wavelengths.

Direct electronic excitation from the ground state to the $a^3\Sigma_g^+$ state apears to be the excitation mechanism. Although this state lies approximately 12 eV above ground, our electron density of $>10^{14}$ cm$^{-3}$ and electron temperature of 2–2.5 eV give a significant number of electrons that could excite this state. According to calculations partially verified by experiment, cross sections of this $X^1\Sigma_g^+ \to a^3\Sigma_g^+$ transition range from about $6 \times 10^{-18}$ cm$^2$ for 12-eV electrons to about $3.5 \times 10^{-17}$ cm$^2$ for $>15$-eV electrons.

Impurities as a source of the laser lines have been ruled out by a series of experiments; additionally, we considered the possibility of emission from $H_3^+$ or $H_3$. A number of absorption lines in $H_3^+$ have been observed in this spectral region but they do not correspond to the laser lines under consideration. Additional evidence for the $a^3\Sigma_g^+ \to c^3\pi_u$ comes from the observation of lines at these same wavelengths in a hydrogen discharge and are attributed to the ac triplet band rather than $H_3$ or $H_3^+$.

This transition seems to be self-terminating, since at high excitation levels the laser ceases while the current is still substantial as shown in FIG. 4. Such a termination is to be expected since there is no radiative decay path from the $c^3\pi_u$ state. Based on this evidence for pumping the $a^3\Sigma_g^+$ state, one expects excimer-type laser action on the $a^3\Sigma_g^+ \to b^3\Sigma_u$ transistion.

We claim:
1. A mid-infrared laser in hydrogen which is produced by applying a high voltage pulse electric discharge means along a low loss cavity containing a gas consisting of hydrogen under pressure between 1 and 10 Torr and reflective cavity mirror assembly means at opposite ends of the cavity and with an ouput at one of said mirror assembly means to cause the gas to lase when a high voltage electric discharge pulse from said high voltage pulse electric discharge means is applied through said hydrogen gas and to produce a laser output at said one of said mirror assembly means along a multiplicity of lines producing output pulses with lengths varying from less than 1 microsecond to over 6 microseconds and with wavelengths in the 3 $\mu$m band.

2. A mid-infrared laser as set forth in claim 1, wherein said high voltage electric discharge pulse has a current value from 100–1200 A, a run voltage from 10–50 kV, and a discharge duration from about 0.5–8 $\mu$sec to cause said laser output to occur along said multiplicity of lines producing output pulses with lengths varying from less than 1 microsecond to over 6 microseconds and with wave-lengths in the 3 $\mu$m band.

3. A mid-infrared laser as set forth in claim 2, wherein said output has wavelengths including 3.71 $\mu$m, 3.77 $\mu$m, and 3.84 $\mu$m.

4. A mid-infrared laser as set forth in claim 1, wherein said high voltage pulse is applied to said hydrogen gas by a Marx bank through a resistor.

* * * * *